INVENTOR
Yoshiaki Ochi
By Stevens, Davis, Miller + Mosher
ATTORNEYS

METHOD OF SELECTING AN FM STEREOPHONIC SIGNAL

Filed Aug. 6, 1963 3 Sheets-Sheet 2

INVENTOR
Yoshiaki Ochi
By Stevens, Davis, Miller & Mosher
ATTORNEYS

INVENTOR
Yoshiaki Ochi
By Stevens, Davis, Miller & Mosher
ATTORNEYS 3,329,773

METHOD OF SELECTING AN FM STEREOPHONIC SIGNAL

Yoshiaki Ochi, Osaka, Japan, assignor to Matsushita Electric Industrial Co., Ltd., Osaka, Japan, a corporation of Japan Filed Aug. 6, 1963, Ser. No. 300,380
Claims priority, application Japan, Aug. 20, 1962, 37/47,784
2 Claims. (Cl. 179—15)

The present invention relates to a method for selecting an FM stereophonic signal out of FM monophonic signals.

As recently FM stereophonic programs are broadcast from certain broadcasting stations simultaneously with monophonic programs from various stations, various electromagnetic waves of both types propagate concurrently.

The FM stereophonic broadcasting is made by means of a so-called compatible system so that stereophonic programs may be received by means of either a stereophonic receiver or a monophonic receiver and monophonic programs may be received by means of a receiver designed for receiving stereophonic programs.

Although the above mentioned fact is a remarkable feature of such a system, it is difficult for audiences to distinguish whether a received program is stereophonic or monophonic. In such a case the audiences have relied merely on their ears for decision. The procedure for selecting a desired stereophonic station is very troublesome particularly in an area where there are many broadcasting stations since the receiving apparatus receives both sterophonic and monophonic broadcastings.

Although various stereo indicators have been devised and put to practical use as means to make up for above mentioned shortcomings, these indicators are only able to indicate the presence of stereophonic signals and the procedure to select a stereophonic station out of many concurrently broadcasting monophonic stations remains unsolved.

It is an object of the present invention to provide a method for selecting and receiving a signal from only a stereophonic station out of concurrently broadcasting monophonic stations. By incorporating the feature of the present invention in a stereophonic receiver, signals from monophonic stations are automatically suppressed during a station selecting operation and stereophonic signals are only received. Thus the selection of stereophonic stations by audiences will be very greatly facilitated by this method.

Figure 1:
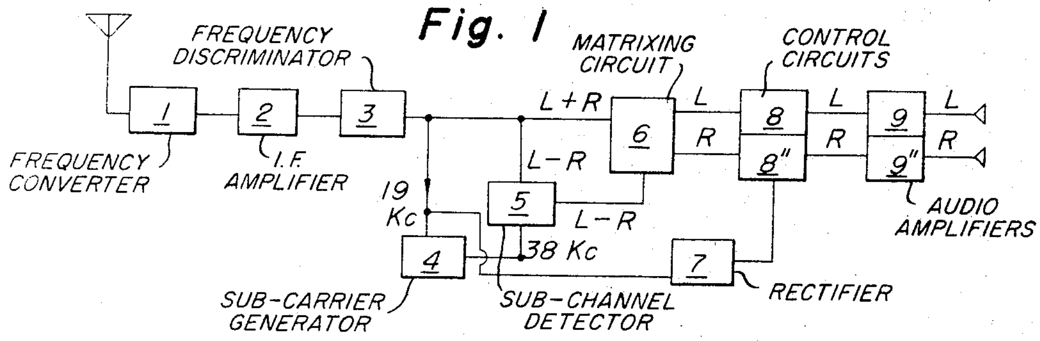
Figure 2:
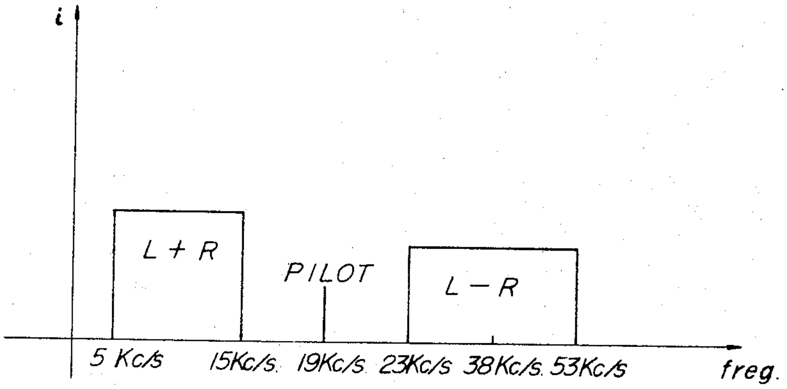
Figure 3:
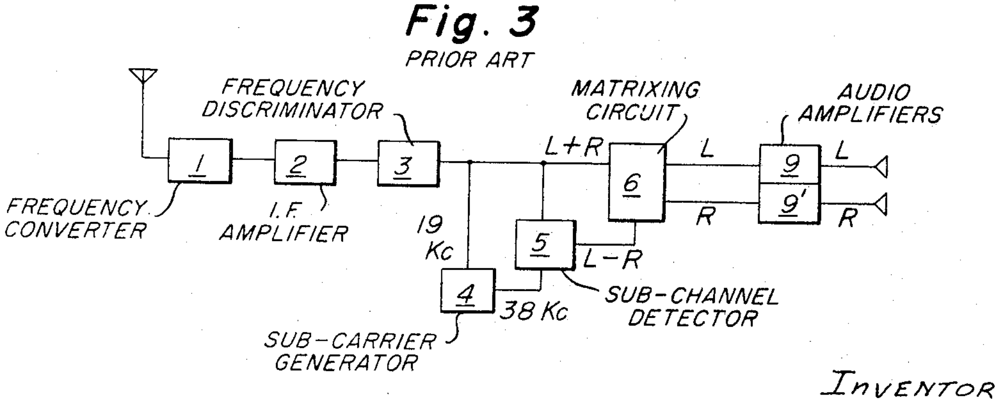
Fig. 3 PRIOR ART
Figure 4:
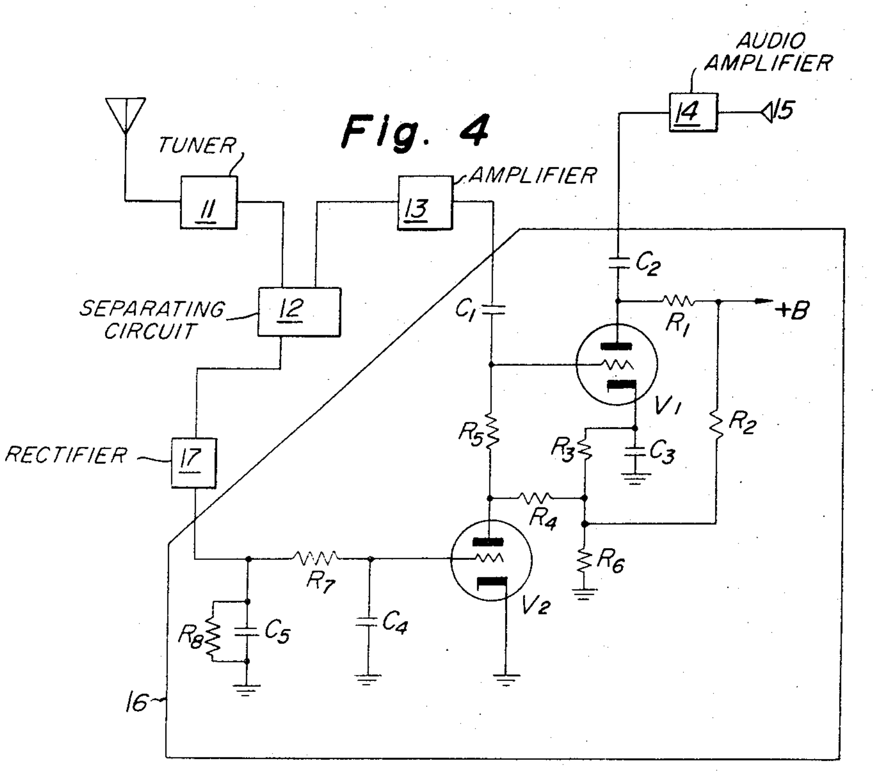
Figure 5:
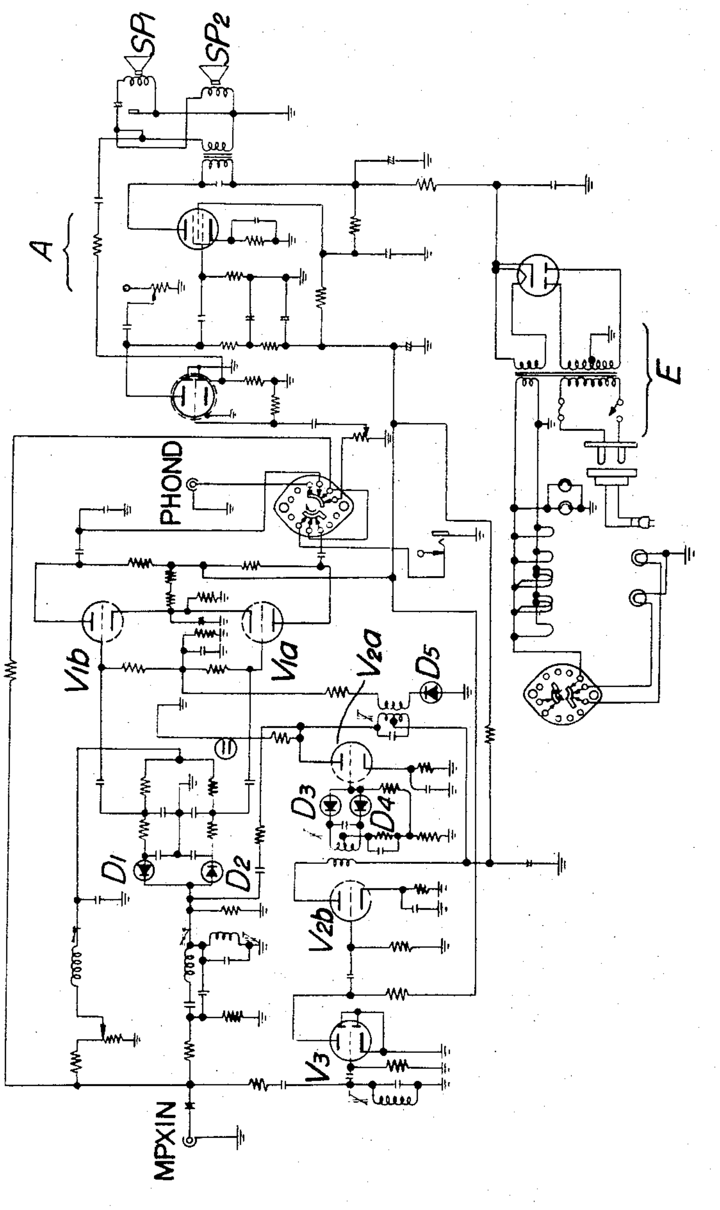

An FM stereophonic signal selecting method according to the present invention will be now described in detail in conjunction with the accompanying drawing wherein:

FIG. 1 shows a block diagram of an FM stereophonic receiving apparatus embodying the method according to the present invention; FIG. 2 shows a plot of frequency distribution in an FM stereophonic signal, FIG. 3 shows a block diagram of a conventional FM receiving apparatus; FIG. 4 shows a practical circuit diagram of a controlling part of the embodiment of the present invention; and FIG. 5 shows a wiring diagram of an FM stereophonic receiver according to the present invention.

Referring to FIG. 1 illustrating a block diagram of a stereophonic receiver according to the present invention, signal waves received at an antenna are fed to a frequency converter 1. The frequency converter 1 is connected through an intermediate frequency amplifier 2 to a frequency discriminator 3. From the frequency discriminator 3 a connection is made directly to a matrixing circuit 6 for forming a main channel, at the same time a sub channel detector 5 is connected in series with the frequency discriminator 3 and the matrixing circuit 6 and a 38 kc. sub carrier generator 4 is connected in series with the frequency discriminator 3 and the sub channel detector 5. In the matrixing circuit 6, L and R signal separation is effected and these separated L and R signals are fed through control circuits 8 and 8' to audio amplifiers 9 and 9', respectively. The outputs of the audio amplifiers 9 and 9' drive L and R speakers, respectively. Between the frequency discriminator 3 and control circuit, there is arranged a rectifier 7.

In operation, FM signal waves received at the antenna are applied to the frequency converter 1. The intermediate frequency signal from the frequency converter 1 is suitably multi-stage amplified in the intermediate amplifier 2 and fed to the frequency discriminator 3 to be demodulated therein.

The demodulated signal is composed of a main channel signal consisting of combined L channel and R channel components distributed from 50 cycles to 15,000 cycles, a pilot signal at 19 kc. and a sub channel signal consisting of $L-R$ signal component distributed from 23 kc. to 53 kc., as shown in a frequency spectrum of FIG. 2.

Among these three signals, the pilot signal component at 19 kc. produces a sub carrier signal at 38 kc. in the sub carrier generator 4. A low frequency $L-R$ signal is obtained by adding the 38 kc. sub carrier signal to the sub channel signal and detecting by means of the sub channel detector 5. The $L-R$ signal thus obtained and the main channel signal regenerated by the frequency discriminator 3 are applied to the matrixing circuit 6 so that the L and R signal may be separated therein.

On the other hand, the pilot signal component at 19 kc. is rectified by the rectifier 7 to produce a direct current component which may be used as a control signal. The control circuits 8 and 8' for L and R channels, respectively, have their operating conditions so set that they give no output, even when an input is applied to them, if the control signal is not applied. They are controlled to give outputs in response to inputs only when they are simultaneously supplied with control signals. The audio amplifiers 9 and 9' can drive the speakers in response to the outputs from control circuits 8 and 8', respectively.

Assuming that the receiver is tuned to FM monophonic waves, the demodulated output of the frequency discriminator 3 contains merely low frequency signals ranging from 50 to 15,000 cycles, and hence the rectifier circuit 7 can not produce the control signal. As a result, the control circuits 8 and 8' supplies no output power, the audio amplifiers are not therefore supplied any input power and no regenerated power is obtained at the speakers.

Assuming next that the receiver is tuned to FM stereophonic waves, the 19 kc. signal component appears in the demodulated signal through frequency discriminator 3, thereby generating a control signal by means of the rectifier circuit 7. As a result, the control circuits 8 and 8' produce output power corresponding to the input with this ocntrol signal, and the L and R signals separated by the sub channel detector 5 and the matrixing circuit 6 are fed through the control circuits 8 and 8' to the audio amplifiers 9 and 9', respectively, to excite them and to be regenerated at the speakers.

Thus the receiver operates to select and receive only the stereophonic electromagnetic waves. A block diagram of a conventional FM stereophonic receiver is illustrated in FIG. 3 for comparison wherein like numerals are employed for corresponding parts to those in FIG. 1.

An embodiment of the feature for selecting the FM stereophonic signal according to the present invention will be now described in detail in connection with FIG. 4, which illustrates a wiring diagram for the control circuits 8 and 8′ in FIG. 1. Although two such channels are practically employed in the stereophonic receiver, only one of the two channels is illustrated in the figure for simplicity.

In FIG. 4, numeral 11 represents a part of a tuner, numeral 12 represents a L, R separating circuit including a 38 kc. generator, a sub channel detector, a matrixing circuit, etc., numerals 13, 14 represent amplifiers and numeral 15 represents a speaker. To the input of the amplifier 14 is connected a control circuit 16 arranged in the input side of the amplifier 14, which is supplied with a control signal through a rectifier 17.

When no signal or a monophonic broadcast is received and hence there is no output from the rectifier 17, the grid of vacuum tube $V_2$ is grounded through resistors $R_7$ and $R_8$ and therefore is retained at a potential equal to that of the cathode, so that a plate current flows through resistors $R_2$, $R_4$ and the tube $V_2$. The grid of vacuum tube $V_1$ is then biased sufficiently negative with respect to the cathode to cut off the plate current through the tube $V_1$ due to the voltage drop across the resistor $R_4$. Thus, the vacuum tube $V_1$ does not produce an output signal corresponding to the input signal supplied from the amplifier 13.

On the contrary, when a stereophonic broadcast is received, a DC output is obtained from the rectifier 17 and causes the grid of the vacuum tube $V_2$ to be baised negative through the filter circuit consisting of capacitors $C_4$ and $C_5$ and resistor $R_7$. The vacuum tube $V_2$ is then cut off to stop the plate current so that the voltage drop across the resistor $R_4$ is removed. As a result, the grid of the vacuum tube $V_1$ is accordingly biased positive by an amount equal to the voltage drop across resistor $R_3$ and the tube $V_1$ becomes conductive. The input signals from the amplifier 13 are therefore amplified at the tube $V_1$ and are fed to the amplifier 14. A capacitor $C_3$ is used as a by-pass condenser for grounding the cathode of the tube $V_1$ with respect to audio input signals, while a resistor $R_6$ is used for DC connecting the cathode of the tube $V_1$ to ground. $R_1$ and $R_5$ are load resistors for tube $V_1$. $C_1$ and $C_2$ are coupling capacitors between stages for stopping DC components.

Although in the above mentioned embodiment the 19 kc. signal component is utilized directly as a control signal, a similar effect may be obtained by using a 38 kc. signal component obtainable by frequency doubling of the 19 kc. signal.

In FIG. 5, there is illustrated a wiring diagram of a receiver incorporating the present invention. Such a receiver is known as a stereo companion receiver and to be used in combination with an FM radio tuner.

Operation of the main part of the receiver will be now described. The main channel signal, the 19 kc. signal and the sub channel signal, supplied at the MPXIN terminal, are separated by means of a filter circuit. The 19 kc. signal component is two-stage amplified by vacuum tubes $V_3$ and $V_{2b}$, doubled in frequency into a 38 kc. signal through detectros $D_3$ and $D_4$ and further one-stage amplified by a vacuum tube $V_{2a}$. The 38 kc. signal component is combined with the sub channel signal and detected through detectors $D_1$ and $D_2$ to obtain the $L-R$ low frequency signal. After combining this $L-R$ signal in the matrixing circuit with the $L+R$ signal supplied through another filter circuit, individual L and R signals are obtained and regenerated. Each of the separated L and R signals is applied to one of the vacuum tubes $V_{1a}$, $V_{1b}$. These tubes $V_{1a}$ and $V_{1b}$ provide control circuits for respective channels. The cathodes of the tubes $V_{1a}$ and $V_{1b}$ normally have positive potentials applied thereto so that they do not effect amplification even when they are supplied with an input. When the stereophonic signal waves are induced and the 38 kc. signal is generated, to be detected by a detector $D_5$, the signal component effectively biases the grids of the tubes $V_{1a}$ and $V_{1b}$ positive so that the tubes $V_{1a}$ and $V_{1b}$ may effect amplification. Then the L and R signals are taken out individually to form output powers. In the figure, a power source and an audio amplifier of the receiving apparatus are denoted by letters E and A, respectively.

Although in the aforementioned embodiment vacuum tubes have been employed for amplifying elements, it is to be understood that the similar result may be obtained by substituting semiconductor elements for the vacuum tubes and the controlling pilot signal may be of other than the 19 kc./s.

As described heretofore, selection between stereophonic and monophonic broadcasts may be effected by utilization of the pilot signal in an FM set, according to the present invention, by connecting merely a control device operated by the pilot signal without the necessity of a manual switching operation. The device may be advantageously incorporated readily into a conventional receiving set and has many industrial merits.

What is claimed is:

1. A receiver system for selecting FM stereophonic signals from broadcast signals including FM monophonic signals and FM stereophonic signals consisting of three signal components: a main channel carrier signal frequency modulated with the sum of two audio signals, a sub-channel carrier signal which has been suppressed-carrier amplitude-modulated with the difference of said two audio signals and a pilot signal of a subharmonic of said sub-channel signal; said receiver system comprising a frequency discriminator for separating a received FM stereophonic signal to produce a demodulated main channel signal, including the sum $L+R$ audio signal, a demodulated sub-channel signal including the difference $L-R$ audio signal and a demodulated 19 kc. pilot signal; a rectifier for rectifying said demodulated 19 kc. pilot signal, and a 38 kc. subcarrier signal component subsidiarily derived from said pilot signal to generate a DC bias control signal; a sub-channel detector in which said demodulated $L-R$ sub-channel signal and said 38 kc. subcarrier signal component are added so that the audio frequency component of said difference $L-R$ signal may be reproduced; a matrix circuit for matrixing said demodulated $L+R$ signal of said main channel and said audio frequency $L-R$ signal derived from said sub-channel detector to separately reproduce L and R audio signals; and a control circuit connected between said matrix circuit and audio amplifiers, said control circuit comprising a first amplifier and a second amplifier for effectively controlling said first amplifier so as to be conductive through the control bias only when the bias is supplied to said second amplifier from said rectifier to amplify the separate L and R audio signals.

2. A system for selecting FM stereophonic signals according to claim 1, in which the output terminal of said second amplifier, to which the output terminals of said rectifier of said matrix circuit are connected, is connected to the control electrode of said first amplifier, the output electrode of which is, in turn, connected to said audio amplifiers.

References Cited

UNITED STATES PATENTS

| | | | |
|---|---|---|---|
| 3,043,914 | 7/1962 | Collins | 179—15 |
| 3,070,662 | 12/1962 | Eilers | 179—15 |
| 3,087,994 | 4/1963 | Schutte | 179—15 |
| 3,225,143 | 12/1965 | Parker | 179—15 |
| 3,248,484 | 4/1966 | Beckman | 179—15 |

DAVID G. REDINBAUGH, *Primary Examiner.*

ROBERT L. GRIFFIN, *Examiner.*